US011225385B2

(12) United States Patent
Haberl

(10) Patent No.: US 11,225,385 B2
(45) Date of Patent: Jan. 18, 2022

(54) HANGER-LOADING STATION FOR OVERHEAD CONVEYORS

(71) Applicant: SSI Schäfer Automation GmbH, Graz (AT)

(72) Inventor: Gerald Haberl, Leoben (AT)

(73) Assignee: SSI Schäfer Automation GmbH (AT), Graz (AT)

(*) Notice: Subject to any disclaimer, the term of this patent is extended or adjusted under 35 U.S.C. 154(b) by 0 days.

(21) Appl. No.: 17/258,103

(22) PCT Filed: Jul. 2, 2019

(86) PCT No.: PCT/EP2019/067756
§ 371 (c)(1),
(2) Date: Jan. 5, 2021

(87) PCT Pub. No.: WO2020/007870
PCT Pub. Date: Jan. 9, 2020

(65) Prior Publication Data
US 2021/0245966 A1    Aug. 12, 2021

(30) Foreign Application Priority Data
Jul. 6, 2018 (DE) ..................... 10 2018 116 420.3

(51) Int. Cl.
*B65G 47/61* (2006.01)
*B65G 9/00* (2006.01)
(Continued)

(52) U.S. Cl.
CPC ............. *B65G 47/61* (2013.01); *B65G 9/004* (2013.01); *B65G 47/29* (2013.01); *B65G 47/8884* (2013.01); *B65G 2201/0229* (2013.01)

(58) Field of Classification Search
CPC ........ B65G 9/004; B65G 47/29; B65G 47/61; B65G 47/8884; B65G 2201/0229
See application file for complete search history.

(56) References Cited

U.S. PATENT DOCUMENTS 4,667,602 A * 5/1987 Vaida ................... B65G 19/025
104/249
4,856,144 A    8/1989 De Greef
(Continued)

FOREIGN PATENT DOCUMENTS

DE    3819102    10/1989
DE    3902712    8/1990
(Continued)

OTHER PUBLICATIONS

International Search Report and Written Opinion issued by WIPO for corresponding International Application No. PCT/EP2019/067756 dated Oct. 14, 2019.

*Primary Examiner* — Gene O Crawford
*Assistant Examiner* — Keith R Campbell
(74) *Attorney, Agent, or Firm* — Renner, Otto, Boisselle & Sklar, LLP

(57) ABSTRACT

A loading station (10) for loading automatically a primary load carrier (36) of an overhead conveyor (18) with a secondary load carrier (38) for hanging goods, comprising: an accumulation line (12), wherein the accumulation line is configured to accumulate primary load carriers, which are movable along the accumulation line, in the conveying direction one behind the other; a separating device (18), which is arranged laterally to the accumulation line, comprising: first and second stopping elements (68) being respectively supported transversally to the accumulation line in a movable manner, wherein each of the stopping elements, in its stopping position, is moved into a conveying path of the primary load carriers, and, in its release position, is moved out of the conveying path; and a switch (76); a control unit (40); a feeding device (16) arranged laterally to the accumulation line, and configured to guide a hanger-shaped head portion of the secondary load carriers through a transport opening in the primary load carrier for loading (Continued)

the primary load carriers, when the primary load carrier is located in a loading position; wherein the switch is arranged oppositely to the feeding device so that the primary load carrier is located in the loading position between the switch and the feeding device.

15 Claims, 9 Drawing Sheets

(51) Int. Cl.
*B65G 47/29* (2006.01)
*B65G 47/88* (2006.01)

(56) References Cited

U.S. PATENT DOCUMENTS

| | | | |
|---|---|---|---|
| 4,946,023 A * | 8/1990 | Heinold | B65G 47/61 198/419.1 |
| 5,193,686 A | 3/1993 | Speckhart et al. | |
| 5,573,101 A | 11/1996 | Ouwejan | |
| 5,660,261 A * | 8/1997 | Speckhart | B65G 47/61 198/357 |
| 5,975,279 A * | 11/1999 | Blattner | B65G 33/02 198/459.4 |
| 6,199,682 B1 * | 3/2001 | Matkovich | B07C 5/02 198/465.4 |
| 10,112,783 B2 * | 10/2018 | Stauber | B65G 33/26 |
| 10,464,752 B2 * | 11/2019 | Iwata | B65G 19/025 |
| 2015/0239671 A1 | 8/2015 | Wend et al. | |

FOREIGN PATENT DOCUMENTS

| | | | |
|---|---|---|---|
| DE | 3902712 A1 * | 8/1990 | B65G 9/00 |
| DE | 9003011 | 8/1991 | |
| DE | 4326095 | 1/1995 | |
| DE | 29709545 | 6/1997 | |
| DE | 29709547 | 6/1997 | |
| DE | 102011080280 A1 | 2/2013 | |
| DE | 102014203239 A1 | 8/2015 | |
| EP | 1462393 | 9/2004 | |
| GB | 2023524 | 1/1980 | |
| JP | H11-49324 | 2/1999 | |
| WO | 93/03985 | 4/1993 | |

\* cited by examiner

HANGER-LOADING STATION FOR OVERHEAD CONVEYORS

This application is a national phase of International Application No. PCT/EP2019/067756 filed Jul. 2, 2019 which claims priority to German Patent Application No. 10 2018 116 420.3 filed on Jul. 6, 2018, all of which are incorporated herein by reference.

The present invention relates to a loading station for automatic loading a primary load carrier (e.g., rolling adapter) of an overhead conveyor with a secondary load carrier (e.g., coat hanger) for hanging goods, such as garments. Further, the present invention relates to a corresponding overhead conveyor including a corresponding loading station.

The invention is used in particular in the fashion industry where garments are stored and transported (in-house) by overhead conveyors hanging on (coat) hangers. In this context the garments are also called hanging goods. The transport of the hanging goods, i.e. the clothes on the hangers, is conducted by the overhead conveyors.

Different types of overhead conveyors exist. With a first type the coat hangers on a slide rail are pushed by drivers. The drivers are arranged separately above the slide rail, and coupled to a drive chain, which is arranged in a further separate guiding rail above the slide rail. With a second type so-called rolling adapters are used, which are sitting in a rolling manner on the transport rail and comprise a body reaching through a slot in the transport rail so that part of the rolling adapter projects downward out of the transport rail. This projecting lower portion of the rolling adapter comprises a transport opening into which, for example, coat hangers or transport pouches can be hung. The rolling adapters are moved by a drive chain which is coupled freely to the rolling adapters. Preferably, the rolling adapters and the drive chain are arranged within the same rail (i.e. within the transport rail) in the second type. This case is also called internally running rolling adapters, a transport opening of which however projects—vertically downward—out of the rail, as will be explained in more detail below. The invention relates to the second type of overhead conveyors.

Known rolling adapters and overhead conveyors are described, for example, in the documents DE 297 09 545 U1, DE 297 09 547 U1, and EP 1 462 393 B1.

For loading the rolling adapters with the coat hangers a loading station is known, as schematically shown in FIG. 16.

The view of FIG. 16 is taken along a conveying direction, i.e. the conveying direction extends perpendicular to the plane of drawing, towards the known loading station 10' which includes an obliquely positioned accumulation line 12' being implemented in FIG. 16 by a hollow profile (transport rail 22'). The accumulation line 12' is inclined relative to the vertical direction Y by an angle α for making an area of the transport opening 48' of the rolling adapter 36' in the horizontal plane XZ as large as possible. The larger the area of the transport opening 48' is, the easier it is to allow dropping the coat hanger 32', which is fed via a rail 33' oriented in the longitudinal direction X parallel to the conveying direction, perpendicular (i.e. parallel to the direction Y) into the transport opening 48', as indicated by means of an arrow. Subsequently, the rolling adapter 36 which has been loaded correspondingly is moved by a rotating device, which is not shown, actively, i.e. in a driven manner, from the inclined position into the vertical normal transport position (cf. rolling adapter 36', and hanger 32' illustrated in dashed lines), as illustrated by an additional arrow.

The return movement of the obliquely oriented rolling adapters 36', induced by an active rotating movement, into its substantially vertically oriented normal position, or transport position, results in that the coat hanger 32' begins to sway, as illustrated again by arrows. When the coat hanger 32' sways, the garments (not illustrated) suspended thereon are swaying as well. The garment moves in an uncontrolled manner. This is not desired in the fashion industry.

Further, it may happen that the coat hanger 32' drops out of the transport opening 48' due to the swinging. This is not desired either.

Finally, the rolling adapters 36' are unnecessarily stressed by the oscillation of the garments and/or coat hangers 32'. This results in an increased wear of the rolling adapters 36'.

Further, many mechanical components are required. The rolling adapters 36' are typically transported through the overhead-conveying installation (not illustrated) in the vertical orientation. The deflection into the oblique position (solid line in FIG. 16) requires decoupling from the main-conveying line. This costs time. The same is true for the returning from the deflected position into the normal vertical transport position (dashed line in FIG. 16).

Therefore, it is an object of the present invention to overcome the above described drawbacks of the automatic loading of coat hangers into primary load carriers of an overhead conveyor.

This object is solved by a loading station for loading automatically a primary load carrier, in particular a rolling adapter, of an overhead conveyor with secondary load carriers, in particular with a coat hanger, for hanging goods, in particular garments, wherein the primary load carrier, which is substantially oriented vertical during transport, is supported movable in a guided manner by means of a pair of travelling rollers within a transport rail of the overhead conveyor, wherein the loading station comprises: an accumulation line, which is preferably implemented as an accumulation conveyor, wherein the accumulation line is configured to accumulate primary load carriers, which are movable in a conveying direction along the accumulation line, in the conveying direction one behind the other; a separating device, which is arranged laterally to the accumulation line, comprising: first and second, in particular finger-shaped, stopping elements, wherein the first and second stopping elements are respectively supported (horizontally) transversal to the accumulation line so that each of the stopping elements, when located in its stopping position, is moved into a conveying path of the primary load carriers, in particular between two of the accumulated load carriers, for accumulating the primary load carriers, and when located in its release position, is moved out of the conveying path for allowing movement of the primary load carriers in the conveying direction; and a switch; a control unit; a feeding device arranged (horizontally) lateral to the accumulation line and configured to guide a hanger-shaped head portion of the secondary load carrier through a transport opening in the primary load carrier for loading the primary load carrier when the primary load carrier is located in a loading position corresponding to a first accumulation position, which in particular corresponds to a downstream located end of the accumulation line being defined by the stopping position of the first stopping element; wherein the switch is arranged oppositely to the feeding device so that the primary load carrier in the loading position is located (horizontally) between the switch and the feeding device, in particular a chute of the feeding device, wherein the switch is moved by the secondary load carrier from a normal position into a separating position as soon as the secondary load carrier has passed through the transport opening in the primary load carrier, and transmits a separating signal to the control unit; and wherein the control unit, when the control unit receives the separating signal, causes, preferably only, the loaded primary load carrier to exit the accumulation line, or the loading position, towards a main-conveying line of the overhead conveyor.

The loading station is formed such that the primary load carriers (preferably rolling adapters) in its normal position, i.e. in a vertically oriented position, can be loaded with the secondary load carriers (coat hangers). This means that the rolling adapters are not deflected relative to the vertical for being loaded. Thereby, the stress on the rolling adapters is minimized.

Time is gained because the rolling adapters do need to be rotated back (actively) from the deflected position into the vertical normal position. In this way loading performance of, for example, up to 7,000 hangers per hour can be achieved, which has been proved experimentally by the applicant. Higher performances of up to 10,000 hangers per hour are possible, which is currently examined.

The secondary load carriers, or hangers, are fed-in in a controlled manner. This means in particular that the garments, which are hanging on the corresponding hangers, do not get into oscillations during the loading process. Thereby it is excluded that the garments drop down during the process of loading the hangers. A desired orientation of the garments on the hangers is maintained. Collision of garments with each other is avoided. Blockade, i.e. garments getting caught, is avoided during the process of loading.

Since the hangers and/or garments do not sway, the primary load carrier, or rolling adapter, is less stressed during the process of loading. The lifetime of the primary load carriers is increased since the wear is decreased.

Transporting the primary load carriers out of the loading position towards a main-conveying line of the overhead conveyor can occur faster because the rotation movement for bringing the primary load carriers into its normal position is omitted. The primary load carriers can be moved directly out of its loading position, in particular in an accelerated manner.

The safety of process is very high. This means that 100% of the hangers are reliably inserted into its rolling adapters without dropping down.

In total the loading station manages with less mechanical components than a conventional loading station. The loading station is constructed more compact. The loading station is constructed shorter. The investment costs are less due to the reduced number of components. The rotation component is missing.

The primary load carriers, or rolling adapters, do not need to be discharged for being positioned obliquely. With other words, the accumulation line can be integrated into the main conveyor. In this case the accumulation line is a portion of the main conveyor.

Preferably, the primary load carrier is substantially oriented vertically in the loading position and along the accumulation line.

That allows achieving the above-mentioned advantages, namely allowing to omit the returning movement, and move the primary load carrier directly out of the loading position.

In particular, the feeding device comprises a chute defining an oblique plane, declining towards the loading position and along which the secondary load carrier slides, preferably by gravity, into the transport opening of the primary load carrier located in the loading position.

The secondary load carriers can be inserted passively, i.e. without an active drive, by the chute into the transport opening of the primary load carrier. The movement occurs by sliding caused by gravity. The insertion is reliable, i.e. the hangers are always inserted safely into the transport opening and do not drop next to it.

In a further embodiment a vertically oriented cross section of the chute comprises an embossed portion, on which an apex of the hanger-like head portion slides towards the loading position, and an adjacent recessed portion configured to guide a tip of the hanger-like portion towards the loading position.

The apex of the hanger head slides almost permanently on the embossed portion (ridge) towards the loading position. The recessed portion (groove) serves for guiding the tip of the hanger head. Basically, the hanger heads can be formed differently. This is particularly expressed in a different position of the tip of the hanger head. With longer hanger heads the tip is arranged deeper than with shorter hanger heads. With the longer hanger heads the recessed portion reliably guides the tip by contact into the transport opening. In this case, there are two points of contact between the chute and the hanger head, namely one between the chute (ridge) and the apex of the hanger head, and another one between the chute (groove) and the tip.

Preferably, the embossed portion and the recessed portion define, in a top view of the chute, parabolic guiding-track portions which lead into the loading position from straight parallel guiding-track portions, and wherein preferably the parabolic guiding-track portion of the embossed portion has a greater slope than the parabolic guiding-track portion of the recessed portion.

This means that the chute comprises, at a downstream end region thereof, parabolic guiding tracks for leading the apex and/or the tip of the hanger head reliably into the transport opening of the primary load carrier in the loading position.

The feeding of the secondary load carriers can occur initially almost parallel to the accumulation line. Feeding perpendicular to the accumulation line is not required necessarily.

The different slopes of the parabolic guiding-track portions cause rotation of the hanger head during the final process of feeding so that the tip passes almost perpendicular through a plane defined by the transport opening of the primary load carrier. Preferably, the plane, in which the hanger head is located, is rotated across the vertical during the loading process. This means that the tip of the hanger head is oriented upstream to the conveying direction, and an oppositely arranged part of the hanger head is oriented downstream. This is advantageous because the primary load carrier is accelerated in the conveying direction out of the loading position so that the garment, or the hanger, is positioned "straight" during the acceleration. This in turn means that a suspension plane of the garment is oriented substantially perpendicular to the conveying direction, as desired.

In another particular embodiment the step, where the control unit causes that (only) the primary load carrier exits the accumulation line towards the main-conveying line by moving the first stopping element from the stopping position into the release position, occurs while the second stopping element is moved from the release position into the stopping position so that the primary load carrier exits the accumulation line while all other primary load carriers located upstream to the loading position are held, or accumulated, by the second stopping element.

The first and second stopping elements are operated such that the primary load carrier in the loading position is released only for being transported away while all other primary load carriers (due to pressure of accumulation) are still accumulated. This is particularly advantageous when the other load carriers are exposed to a high pressure of accumulation. The high pressure of accumulation ensures that the other primary load carriers are fed at high velocity, in particular into the loading position, as soon as the loaded primary load carrier has left the downstream end of the accumulation conveyor, i.e. the loading position.

Also, these measures increase the safety of process. In addition, they ensure that a high performance of loading is achievable, while the empty primary load carriers are supplied fast and safely.

In another particular configuration the separating device further comprises a (horizontally) circulating closed conveying string, such as a strap, which comprises at least one driver projecting out, wherein the conveying string is arranged such that the at least one driver contacts only the primary load carrier in the loading position of the accumulated primarily load carriers, and subsequently gives a push parallel to the conveying direction.

The separating device also ensures that the loaded primary load carrier is accelerated out of its loading position for being fed into the main line later. The conveying string is arranged (and formed) such that only the loaded load carrier is accelerated. The driver touches only the loaded primary load carrier. All other empty primary load carriers are not touched so that collisions and blockades are prevented.

Preferably, the conveying string is moved in a clocked manner when the conveying string comprises several drivers, wherein the drivers are arranged at equal distances along the conveying string, and wherein a cycle is defined by the distance between neighboring drivers.

In particular, a relative (clear) distance of the first and second stopping elements along the conveying direction is smaller than a distance between two accumulated primary load carriers.

In this manner it is ensured that only the loaded primary load carrier is separated, while all other empty primary load carriers are stopped reliably.

In an advantageous configuration the switch is a contact switch, or switching rocker, which returns automatically into the normal position after deflection by the secondary load carrier and transporting away of the loaded primary load carrier.

Thus, the loading station is ready for a new loading process.

The switch is a binary system (primary load carrier is loaded, or is not loaded) so that the safety of process is high.

Further, the above object is solved by an overhead conveyor, or an overhead conveyor system, including a loading station which is formed as described above.

It is clear that the above-mentioned and hereinafter still to be explained features cannot only be used in the respectively given combination but also in other combinations or alone without departing from the scope of the present invention.

Embodiments of the invention are illustrated in the drawings, and will be explained in the description below in more detail.

Figure 1:
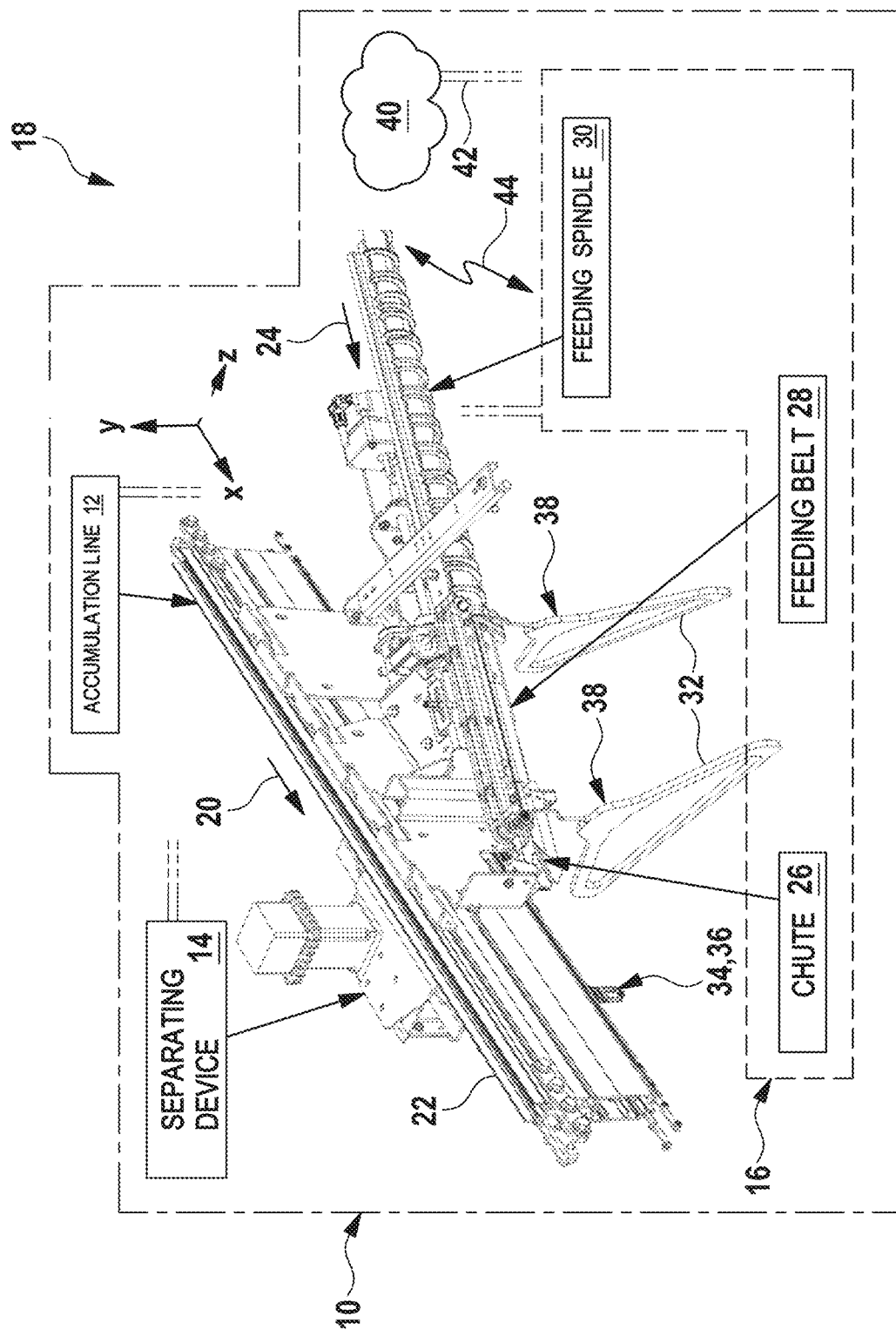
FIG. 1 shows a schematic illustration of a loading station being part of an overhead conveyors (not illustrated)

FIG. 1 shows a perspective illustration of a loading station 10 comprising an accumulation line 12, a separating device 14, and a feeding device 16. The accumulation line 12, the separating device 14, and the feeding device 16 meet in a point of material flow, as will be explained in more detail below. The loading station 10 is part of an overhead conveyor 18, which is not illustrated in more detail here, coupled, for example, upstream to the accumulation line 12 and downstream to the separating device 14. In this case the loading station 10 is integrated directly into a course of the overhead conveyor 18. Alternatively, the loading station 10 can be coupled mesh-shaped or loop-shaped to the overhead conveyor 18.

The accumulation line 12 can be formed passively or actively.

The passive embodiment is not provided with a drive. In this case the accumulation line 12 is implemented, for example, by an inclined rail using gravity for transporting.

The active variation is provided with a drive for moving primary load carriers 34 in a driven manner along the accumulation line 12. In this case the accumulation line 12 is an accumulation conveyor. An exemplary accumulation conveyor is shown in WO 2017/109042 A1, which is incorporated by reference here.

In FIG. 1 a Cartesian coordinate system XYZ is shown exemplarily. The accumulation line 12 extends, for example, parallel to the longitudinal direction X, and thus also defines the conveying direction 20 since a (transport) rail 22 of the accumulation line 12 (and overhead conveyor 18) extends parallel to the longitudinal direction X.

The feeding device 16 can be arranged (horizontally) oblique to the longitudinal direction X so that a feeding device 24 and the conveying direction 20 exemplarily define an angle of 30° to 40° relative to each other. It is clear that any other arbitrary angle, preferably up to 90°, is selectable. Further, it is clear that the loading station 10 which is located in FIG. 1 substantially horizontal, i.e. in the plane XZ, can be (additionally) arranged inclined relative to the horizontal.

The accumulation line 12, separating device 14, and feeding device 16 meet in one common point (loading point), as will be explained hereinafter in more detail.

The separating device 14 is arranged laterally (horizontal) to the downstream end of the accumulation line 12. The feeding device 16 is also arranged oppositely to the separating device 14 laterally (horizontal) to the downstream end of the accumulation line 12.

The feeding device 16 serves for feeding secondary load carriers 38 (e.g., hangers 32 or pouches) individually, and includes a chute 26 which will be explained in more detail, in particular with reference to FIG. 5.

Further, the feeding device 16 can optionally include one feeding belt 28 and/or one feeding spindle 30, wherein the feeding belt 28 and spindle 30 are operated preferably synchronized to each other. The feeding belt 28 and the spindle 30 ensure that the hangers 32 are transported at a desired distance to each other. This distance is required for loading the primary load carriers 34 (cf. FIG. 2), which are implemented as rolling adapters 36 or as other holding elements, with a high safety of process. The hangers 32 are exemplary secondary load carriers 38.

Further, the loading station 10 comprises a control unit 40 being connected via lines 42 and/or wireless (cf. double arrow 44) to the individual components of the loading station 10.

Figure 2:
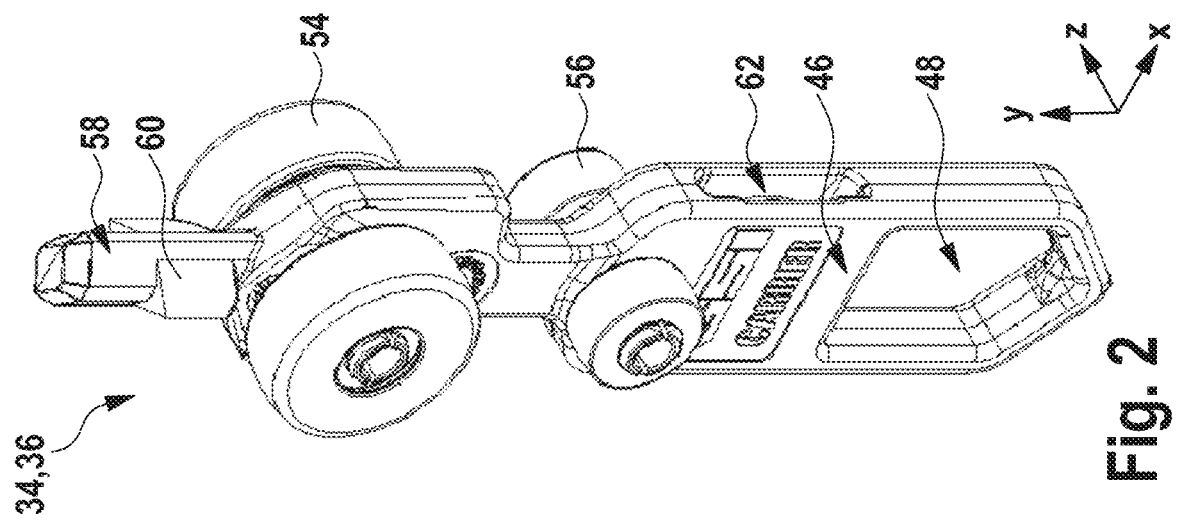
FIG. 2 shows a perspective view of an isolately illustrated primary load carrier implemented as a rolling adapter.

FIG. 2 shows a perspective illustration of one primary load carrier 34 which is implemented as a rolling adapter 36. The primary load carrier 34 is used in the loading station 10 of FIG. 1. Hereinafter the rolling adapter 36 will be considered only as the preferred embodiment of the primary load carrier 34. It is clear that the primary load carrier 34 can also be implemented by different holding elements which are moved in a guided manner in the transport rail 22.

The rolling adapter 36 comprises a body 46 oriented substantially along the vertical plane XY in its normal transport position. It goes without saying that the body 46 also comprises a recess in the transversal direction Z. Nevertheless, the body 46 is oriented substantially vertical. A longitudinal direction of the body 46 is oriented parallel to the direction Y.

Figure 16:
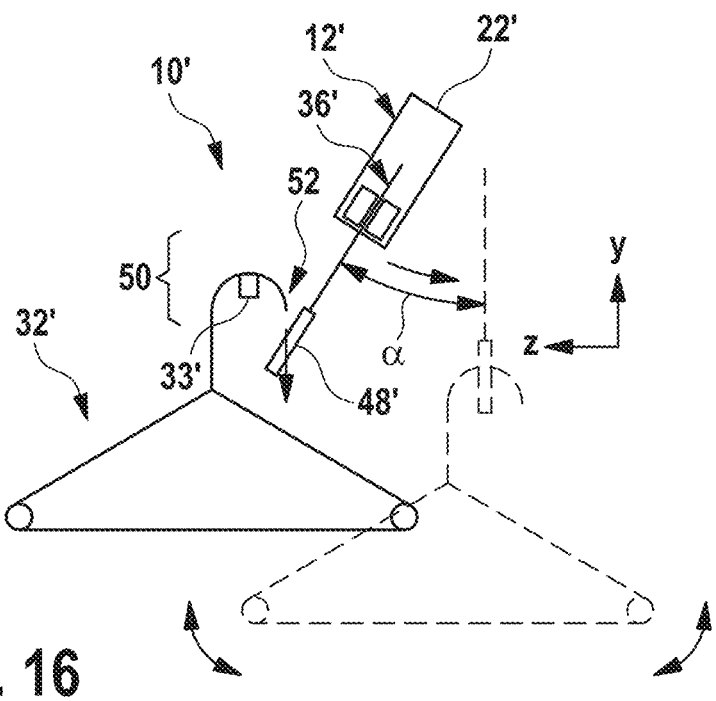
FIG. 16 shows a loading station according to the prior art.

In a lower portion the body 46 comprises a transport opening 48. The transport opening 48 is configured to receive a hanger-shaped head portion 50 (cf. FIG. 16) of the hanger 32 (cf. FIG. 1), wherein a tip 52 (cf. FIG. 16) of the head portion 50, which is formed at least partially open, passes through the transport opening 48 (cf. FIG. 2). In the normal transport position of the rolling adapter 36 the transport opening 48 extends substantially in the vertical plane XY.

The rolling adapter 36 comprises first pair of travelling rollers 54, and an (optional) second pair of supporting rollers 56. The rollers 54 and 56 are respectively supported on an axis of rotation (not designated in more detail, horizontal) extending parallel to the transversal direction Z. One of the rollers 54 and 56 is arranged at each side of the body 46 in the transversal direction Z.

A web-like driver portion (which is not designated in more detail) of the body 46 extends above the travelling rollers 54. The web-like driver portion is formed by a head web 58, and an (optional) driver web 60. The head web 58 extends substantially in the vertical direction Y, whereas the driver web 60 extends substantially parallel to the transversal direction Z.

The rolling adapter 36 can further receive, or have attached, an identification device 62 (e.g., an RFID-tag, or the like) in its lower portion in order to distinguish the corresponding rolling adapter the (bi)uniquely.

Figure 3:
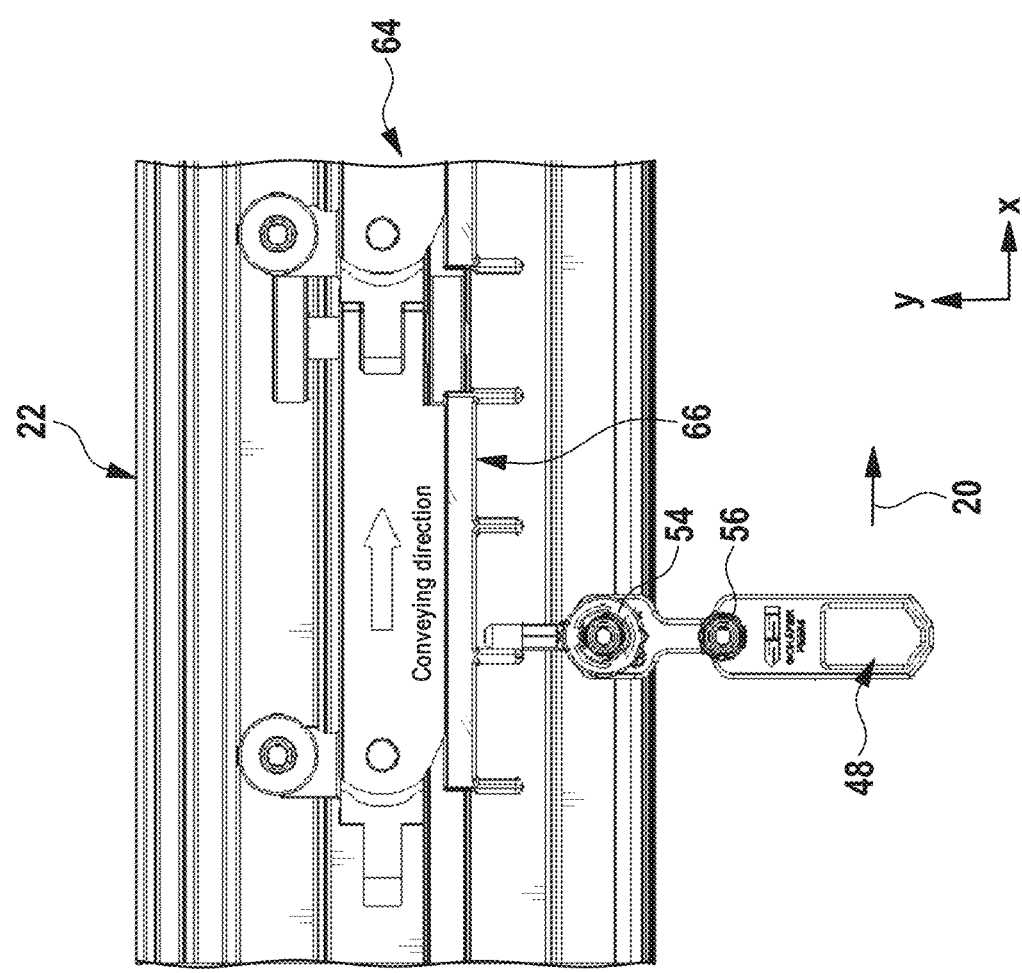
FIG. 3 shows a schematic side view of a transport rail when looking into an interior of the rail in order to see the primary load carrier of FIG. 2.

FIG. 3 shows a side view of a main-conveying line (not designated in more detail here), which includes a transport rail 22 like the accumulation line 12 in FIG. 1. In the illustration of FIG. 3 the rail 22 is illustrated such that an interior of the rail 22 can be looked at.

A drive chain 64 of the overhead conveyor 18 is movably supported in a guided manner in the interior of the rail 22. The drive chain 64 comprises travelling and supporting rollers, which are not designated here in more detail, for being moved in a guided manner within the rail 22. In a lower portion of the drive chain 64 comb-like driver elements 66 are provided. The driver elements 66 are coupled to the chain 64, and extend substantially in the longitudinal direction X. The driver elements 66 are formed with prongs (which are not designated here in more detail) extending substantially in the vertical direction Y. These prongs mesh with the heads of the rolling adapters 36 for moving the rolling adapters 36 in the conveying direction 20.

The travelling rollers 54 of the rolling adapter 36 are arranged within the rail 22, whereas the optional supporting rollers 56 are positioned outside of and beneath the rail 22. The rolling adapters 36 travel inside. The rolling adapters 36 are supported by means of its travelling rollers 54 on lower transversal webs (which are not designated in more detail here) of the rail 22.

The lower portion of the rolling adapter 36 projects downward out of the rail 22. In particular, the transport opening 48 projects downward out of the rail 22.

Figure 4:
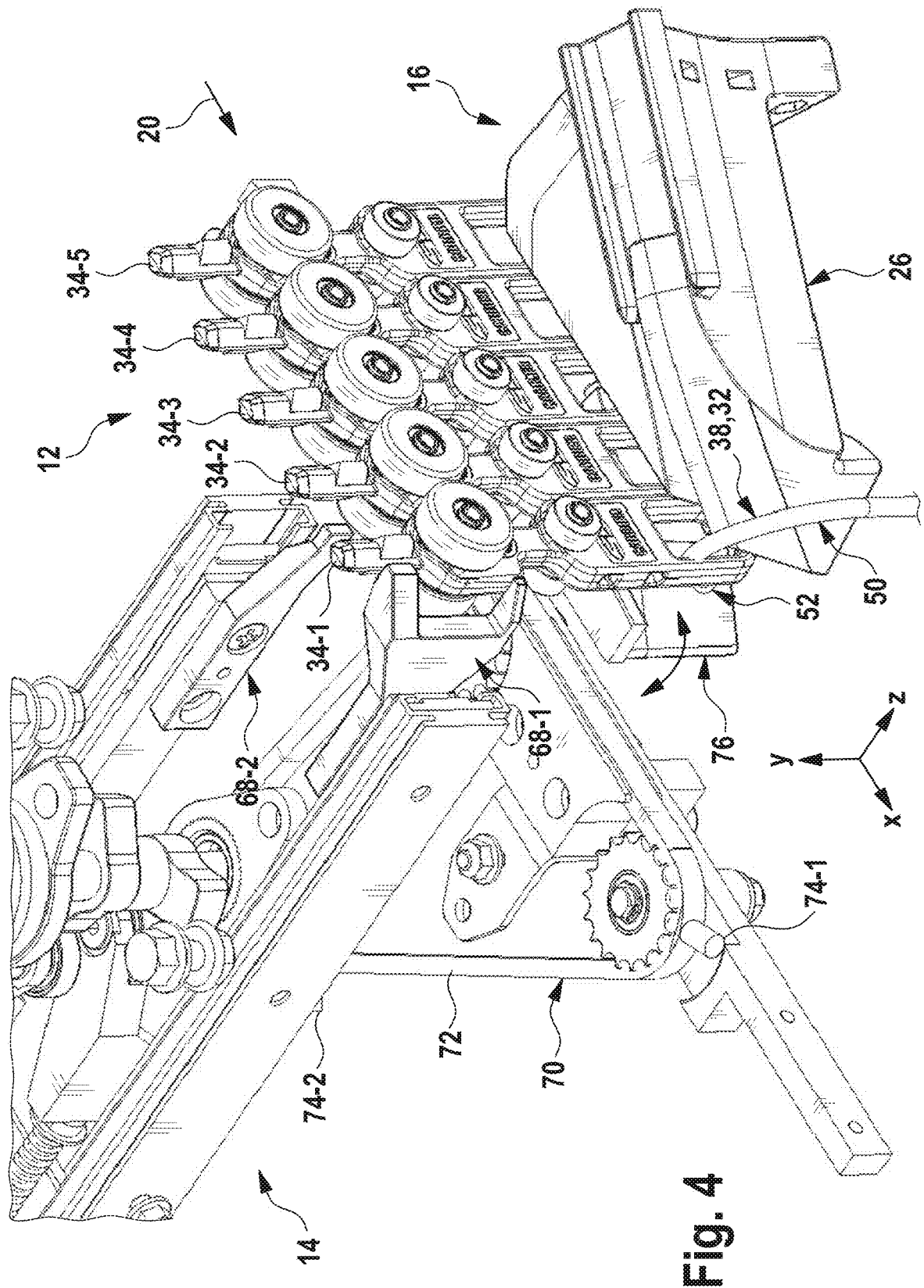
FIG. 4 shows a broken perspective partial view of the loading station of FIG. 1.

FIG. 4 shows a schematic perspective illustration of the loading station 10 of FIG. 1, wherein some components of the loading station 10 are not explicitly illustrated for simplifying an understanding.

In FIG. 4 the accumulation line 12, separating device 14, and feeding device 16 of FIG. 1 are illustrated only partially. Further, for example, the rail 22 of the accumulation line 12 is not shown.

The accumulation line 12 is substantially indicated by accumulated primary load carriers 34-1 to 34-5.

The separating device 14 is indicated by its first and second stopping elements 68-1 and 68-2, as well as a conveying string 70. The conveying string 70 comprises, for example, one closed (driving) strap 72 having at least one driver 74. In FIG. 4 two drivers 74-1 and 74-2 are recognizable which project (perpendicularly) out of the strap 72. The conveying string 70 is arranged in the horizontal plane XZ. The drivers 74 are configured to cooperate with a tapered portion of the body 46 of the rolling adapters 36. The tapered portion (which is not designated in more detail here) of the body 46 is arranged vertically between the travelling rollers 54 and supporting rollers 56 (cf. FIG. 2).

The stopping elements 68 are supported movably. The stopping elements 68 extend in the transversal direction Z, and are movable in the transversal direction Z, for example, along guiding rails (which are not designated in more detail here). The first stopping element 68-1 located downstream is shown in a stopping position in FIG. 4. In the stopping position the corresponding stopping element 68 is moved into a conveying path (which is not designated in more detail here) of the rolling adapters 36. This means that the stopping element 68 in its stopping position prevents transport of the rolling adapters 36 in the conveying direction 20. The first stopping element 68-1 is extended in the positive transversal direction Z. The first stopping element 68 is clip-shaped in a front portion.

In FIG. 4 the second stopping element 68-2 is shown in a (retracted) release position. Also, the second stopping element 68-2 is supported movably in the transversal direction Z. The second stopping element 68-2 can be moved in the positive transversal direction Z into the conveying path of the rolling adapters 36 for stopping all rolling adapters 36 located upstream to the second stopping element 68-2, as it will be explained in more detail hereinafter.

In principle, the stopping elements 68 can be shaped like fingers, or rods.

In the stopping position the stopping element 68-1 holds the primary load carrier 34-1 in a loading position. In FIG. 4 indicates that a secondary load carrier 38 in terms of a hanger 32 has already been inserted into the transport opening 38. The tip 52 of the hanger 32 touches a switch 76. The switch 76 is part of the separating device 14. In FIG. 4 the switch 76 is shown in a switching position. In the switching position the switch 76 is deflected by the hanger 32, as indicated by means of a double arrow.

With reference to FIGS. 5 to 9 structure and mode of operation for feeding, or loading, the hangers will be described in more detail hereinafter.

Figure 5:
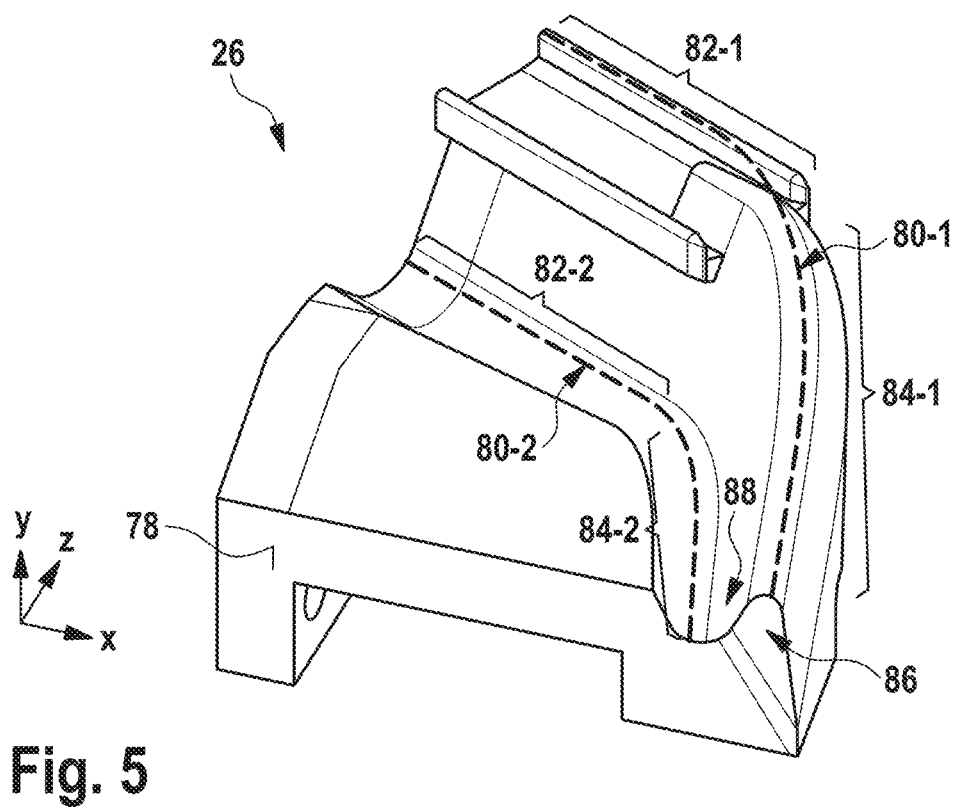
FIG. 5 shows a perspective schematic view of a chute of a feeding device of the loading station of FIG. 1.

In FIG. 5 the chute 26 of the feeding device 16 of FIG. 1 is illustrated alone. FIG. 5 shows a perspective view of the chute 26.

A face 78, which is oriented in the vertical plane XY, illustrates a vertically oriented cross section through the chute 36 at a downstream end of guiding tracks 80-1 and 80-2, which are indicated by dashed lines in FIG. 5. The guiding tracks 80 are possible points of contact between the hanger-shaped head portion 50 of the hangers 32 and the chute 26.

The guiding tracks 80 can include straight guiding-track portions 82-1 and 82-2, as well as parabolic guiding-track portions 84-1 and 84-2.

The straight portions 82-1 and 82-2 are preferably horizontal, i.e. oriented in the plane XZ. The straight portions 82-1 and 82-2 are arranged preferably parallel to each other at different heights. The upper straight portion 82-1 can be defined by two supporting webs (which are not designated here in more detail) where the head portion 50 (not shown here) of the hanger 32 (not shown here) gets into contact at two locations. The lower straight portion 82-2 serves for guiding the tip 52 (which is not illustrated) of the hanger 32.

Preferably parabolic portions 84 follow downstream to the straight portions 82. In particular, the parabolic portions 84 are located in inclined planes declining in the feeding device 24 (cf. FIG. 1) towards the loading position (cf. FIG. 4). The upper parabolic portion (84-1) serves for guiding an apex of the head portion 50 of the hangers 32. The lower parabolic portion 84-2 serves for guiding the tip 52 of the head portion 50.

A (mathematical) slope of the upper parabolic portion 84-1 preferably is greater than a slope of the lower parabolic portion 84-2. This means that the portion 84-1 is curved stronger than the portion 84-2 towards the loading position (FIG. 4) in the downstream direction.

In the vertical cross section the (upper) parabolic portion 84-1 forms an apex of the embossed (cross sectional) portion 86, whereas the lower parabolic portion 84-2 forms a (lower) apex of a (cross sectional) portion 88.

Although the hangers 32 are substantially in contact with the upper parabolic portion 84 normally, the lower parabolic portion 84-2 can get into contact with the tip 52 additionally, when the head portion 50 is dimensioned extra large, or long.

This specific geometry ensures that the hangers 32 are inserted in a process-safe manner into the primary load carrier 34-1 positioned furthest downstream (cf. loading position the FIG. 4).

With reference to the following FIGS. 6 to 9 different states of a sequence for loading hangers are illustrated in a chronological sequence. FIGS. 6 to 9 show enlarged perspective views of FIG. 4 with a focus on the feeding of the hangers.

Figure 6:
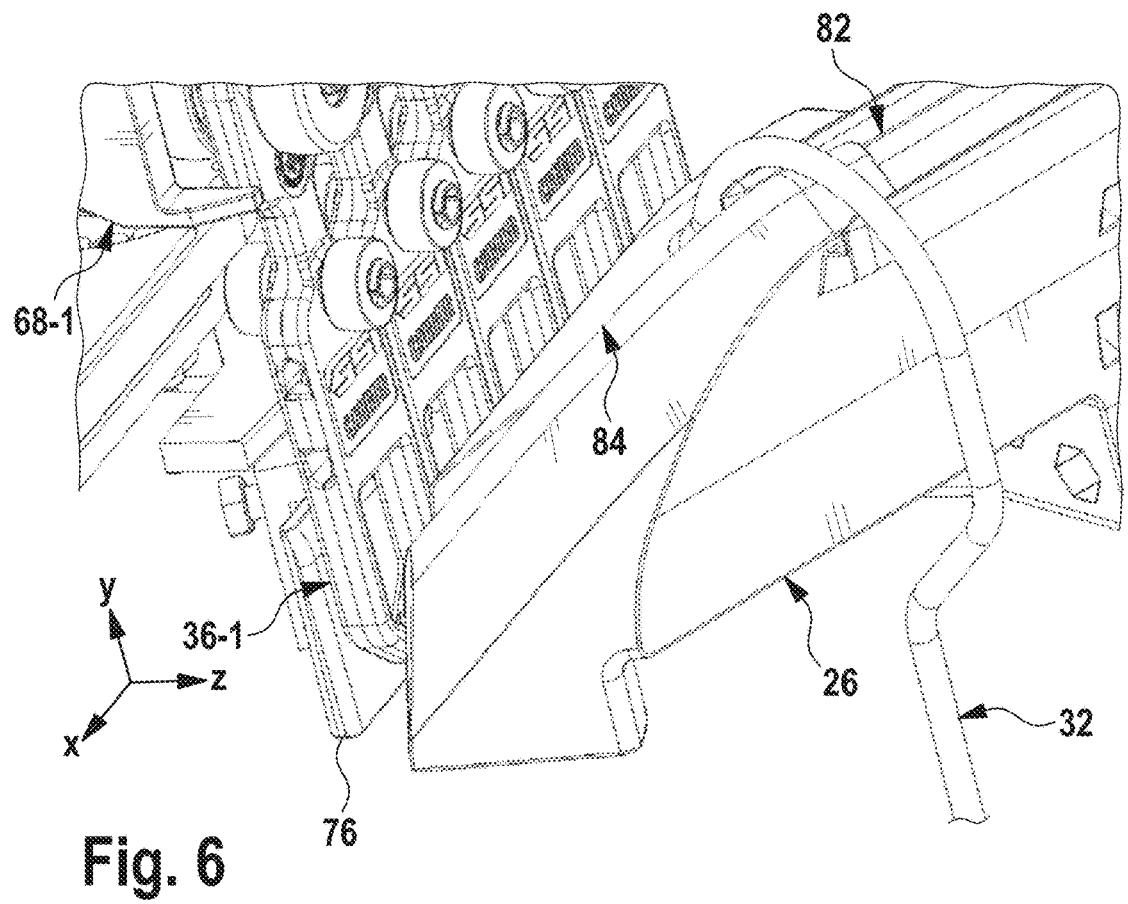
FIG. 6 shows a perspective illustration of a first state of a loading sequence.

FIG. 6 shows transition of the hanger 32 from the straight portion 82 of the guiding track to the parabolic portion 84. The (empty) rolling adapter 36-1 is held in the loading position by the extended first stopping element 68-1.

Figure 7:
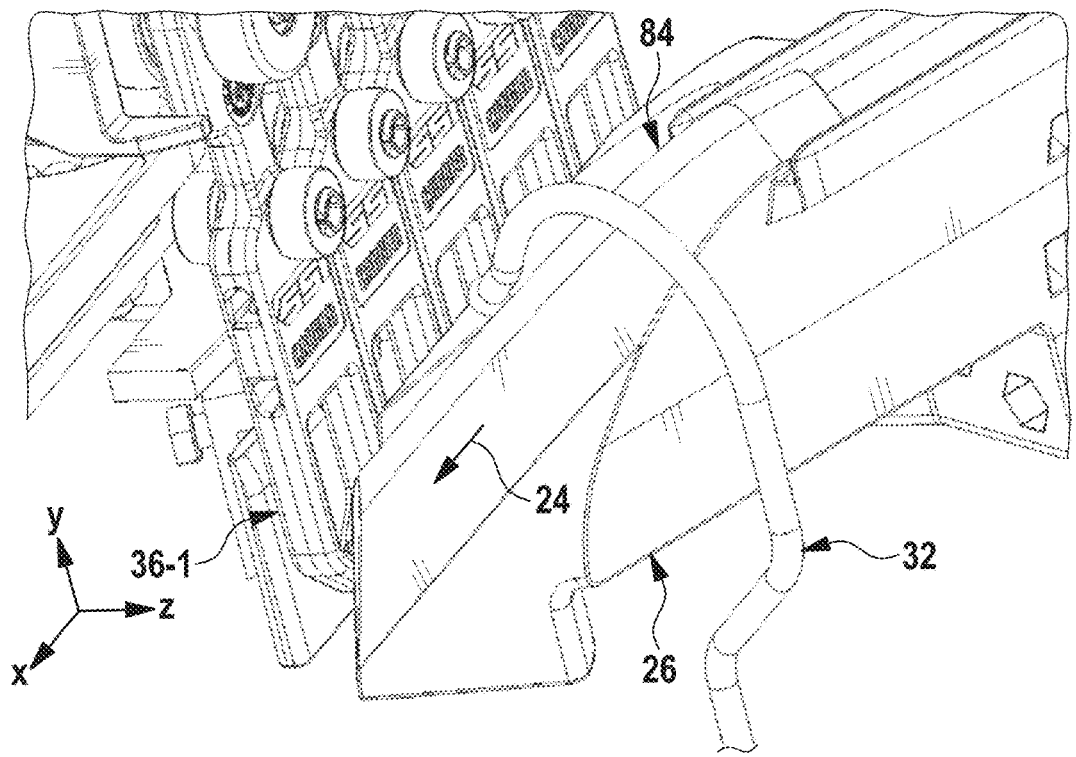
FIG. 7 shows an illustration of a second state of the loading sequence.

In FIG. 7 the hanger 32 has already sled down a little. FIG. 7 shows a second state of the feeding of hangers at a later time than FIG. 6. The hanger 32 moves (by gravity) into the feeding device 24 along the parabolic portion 84 of the chute 26.

Figure 8:
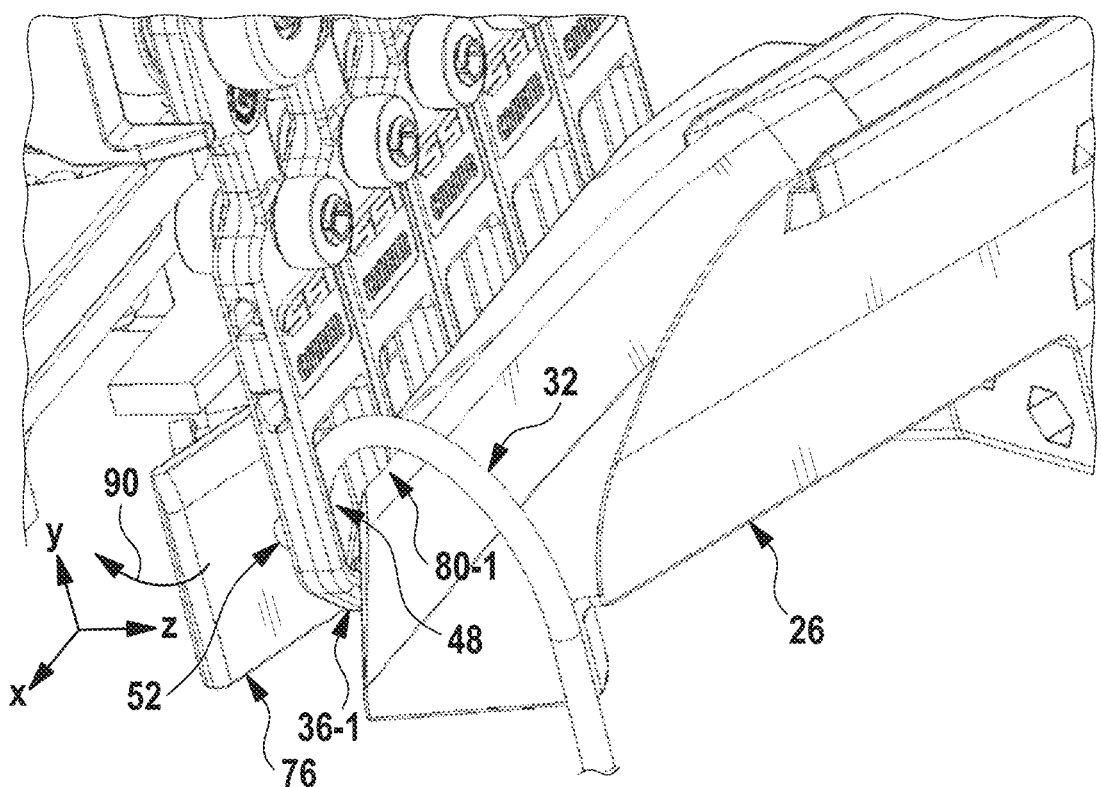
FIG. 8 shows an illustration of a third state of the loading sequence.

FIG. 8 shows the hanger 32 in a third state after the hanger 32 has sled down a little further. The tip 50 of the hanger 32 has passed through the transport opening 48 of the rolling adapter 36-1, and touches the switch 76. Thereby, the switch 76 is moved, in particular pivoted, into its switching position, as indicated by an arrow 90.

Figure 9:
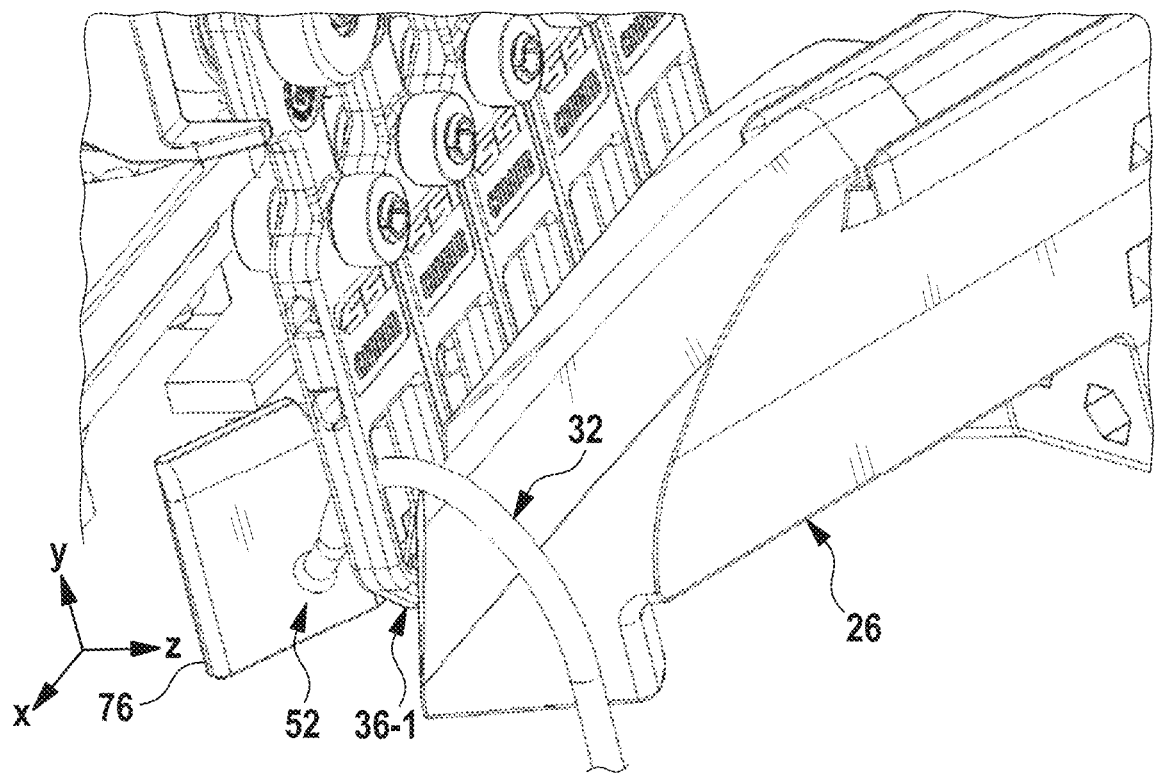
FIG. 9 shows an illustration of a fourth state of the loading sequence.

FIG. 9 shows the end of the process for feeding and loading the hanger, where the tip 52 of the hanger 32 has deflected the switch 76 completely. Then, the switch 76 is located safely in its switching position at the latest. In the switching position the switch 76 transmits a separating signal (not illustrated) to the separating device 14 and control unit 40 for transporting away the loaded rolling adapter 36-1 from the loading position at the downstream end of the accumulation line 12.

The separation of the loaded rolling adapter 36-1 will be described hereinafter with reference to FIGS. 10 to 15 illustrating states of a separating process which are temporarily subsequent to each other.

Figure 10:
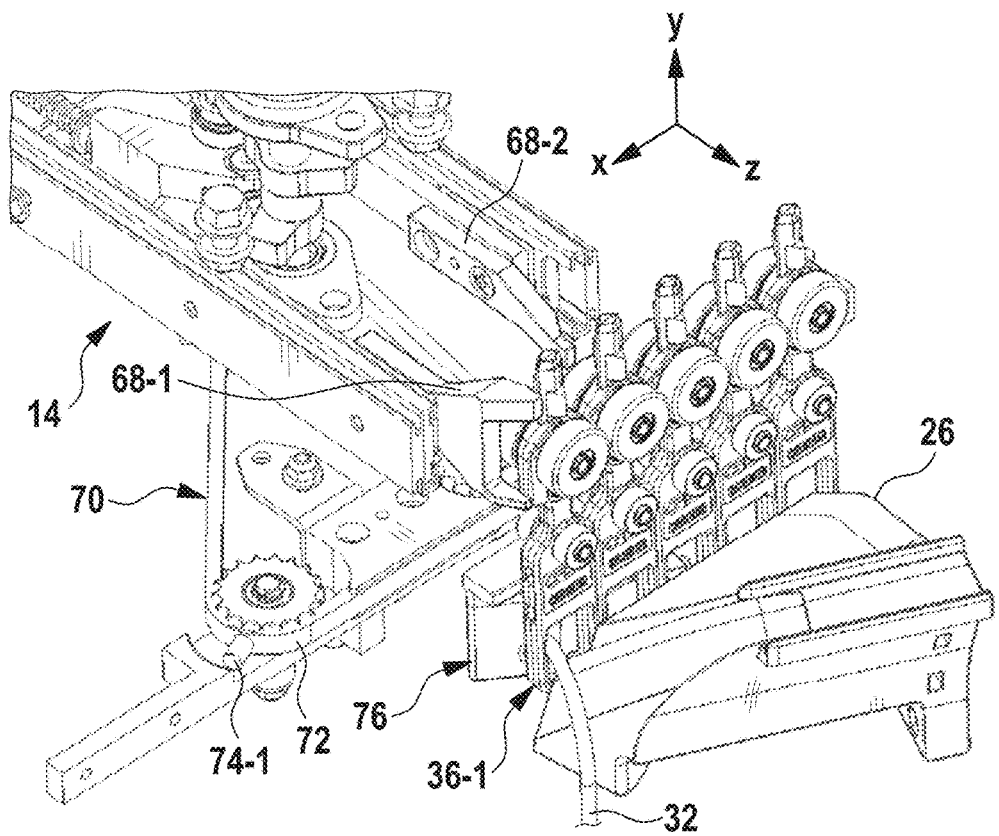
FIG. 10 shows a first state of a separating sequence.

FIG. 10 shows a first state of a separating process triggered by the separating signal of the switch 76 located in its separating position. The separating signal is received by the control unit 40 (cf. FIG. 1) for causing the processes which are described below. FIG. 10 corresponds to FIG. 4, and shows the same state as FIG. 9, but reduced in illustration. In addition to the chute 26, FIG. 10 also shows the separating device 14 with its circulating conveying string 70, which is exemplarily implemented by a strap 72. In FIG. 10 the first stopping element 68-1 is located in the (extended) stopping position, whereas the second stopping element 68-2 is located in the (retracted) release position. FIG. 10 represents the starting point of time of the separating process.

Figure 11:
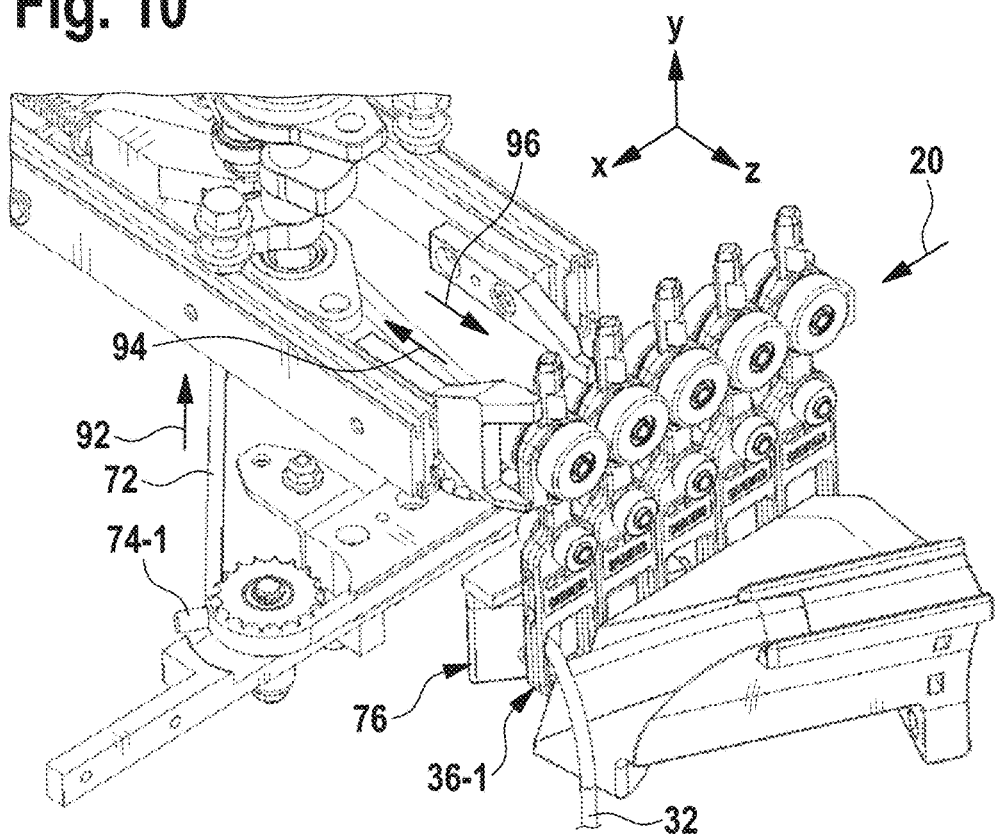
FIG. 11 shows a second state of a separating sequence.

FIG. 11 shows a temporarily later state. The strap 72 is moved clockwise (cf. arrow 92), whereby also the drivers 74 are moved which are fixedly attached to the strap 72. In FIG. 11 only one of the drivers 74 can be recognized in the region of a deflection pulley of the strap 72. A further driver 74 is located in the immediate vicinity of the first rolling adapter 36-1 for pushing the same in the conveying direction 20, i.e. parallel to the longitudinal direction X.

The first stopping element 68-1 (cf. arrow 94) is retracted (in the negative transversal direction Z), while the second stopping element 68-2 starts to move into its stopping position by being extended in the positive transversal direction Z (cf. arrow 96). However, the loaded rolling adapter 36-1 is still held by the first stopping element 68-1.

Figure 12:
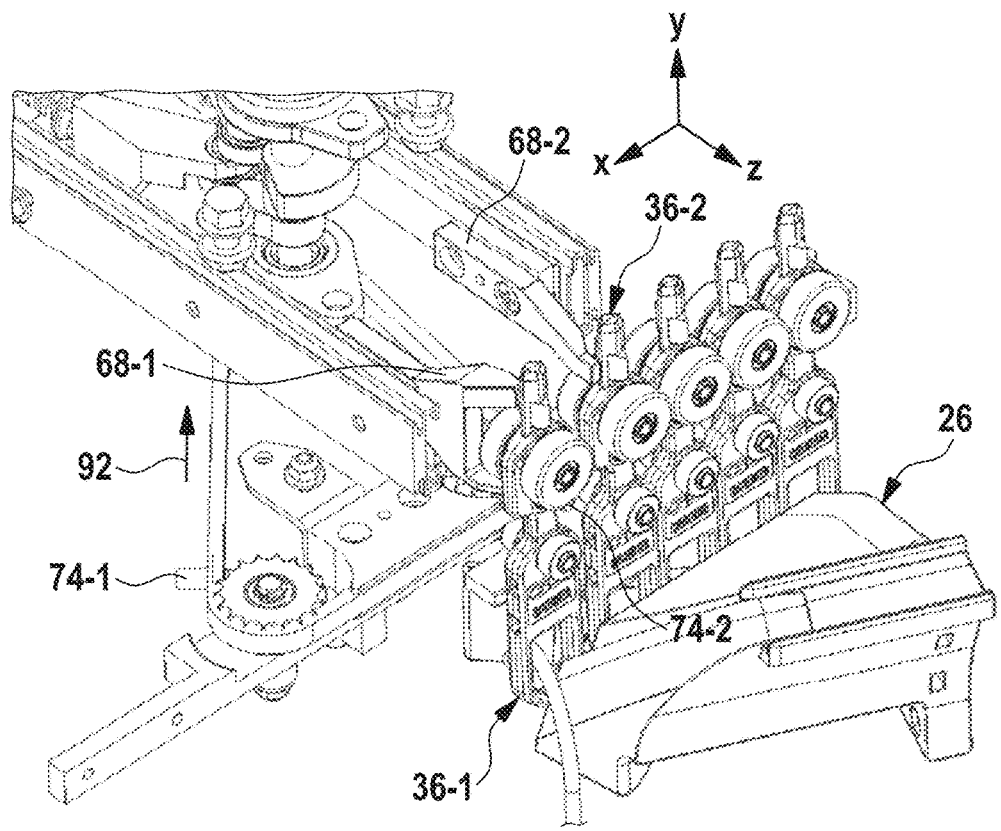
FIG. 12 shows a third state of a separating sequence.

FIG. 12 shows the next state of the separating process which is briefly later in timing than the state of FIG. 11. The strap 72 is still moved clockwise (cf. arrow 92). The first stopping element 68-1 is completely retracted, and thus located in its release position so that the loaded rolling adapter 36-1 is pushed by the driver 74-2 for being moved out of the loading position. The second stopping element 68-2 is completely extended, and thus located in its stopping position. The second stopping element 68-2 holds fixedly the second rolling adapter 36-1 and each subsequent one in order to prevent the rolling adapter 36-2 from moving up of into the loading position.

Figure 13:
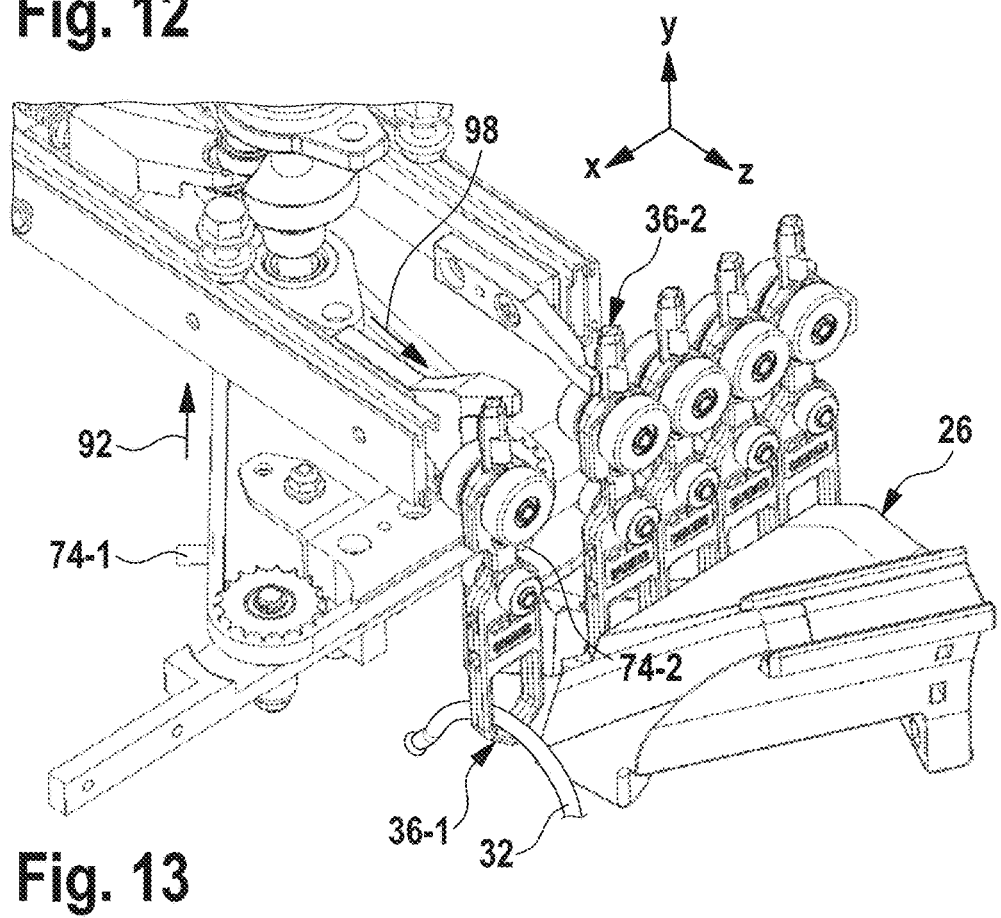
FIG. 13 shows a fourth state of a separating sequence.

FIG. 13 shows the FIG. 12 at a slightly later time. The strap 72 is still moved, preferably continuously, clockwise. The rolling adapter 36-1 has safely left the loading position so that the first stopping element 68-1 can be extended again (cf. arrow 98).

Figure 14:
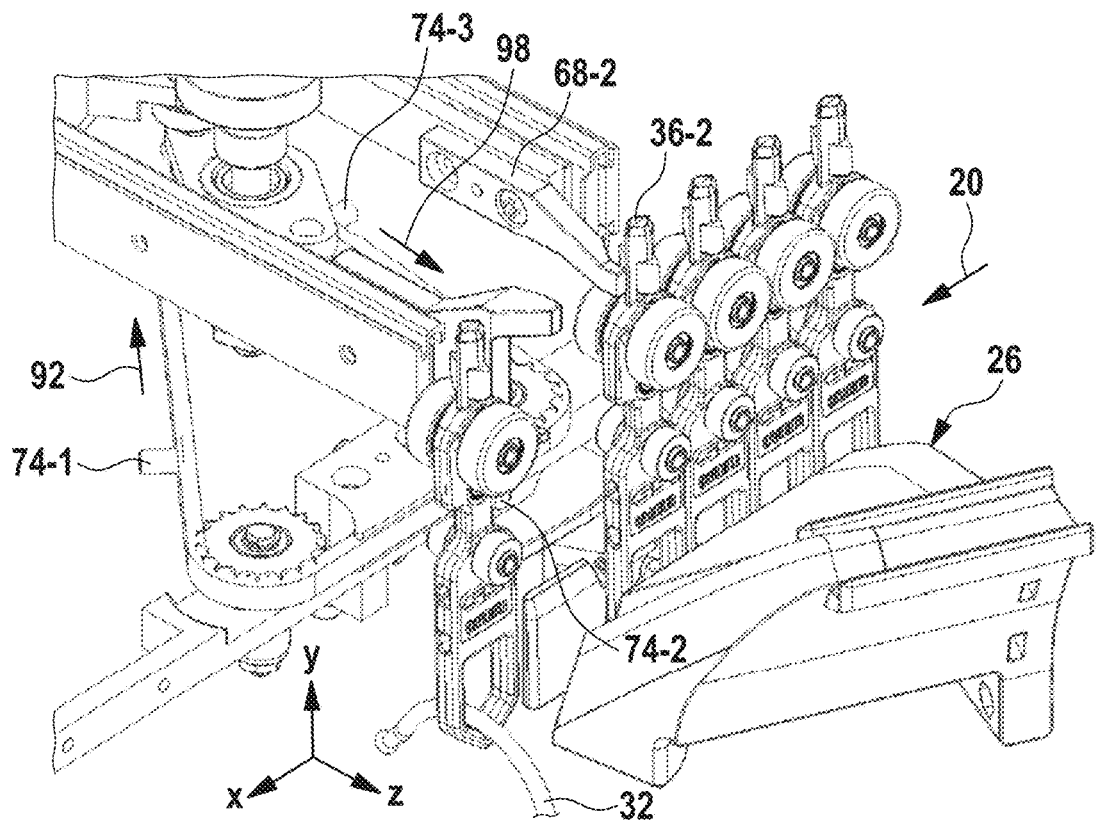
FIG. 14 shows a fifth state of a separating sequence.

FIG. 14 shows the empty loading position at a later time than in FIG. 13. Any rolling adapter 36 is located in the loading position.

In FIG. 14 the first stopping element 68-1 is almost completely extended again, and thus located briefly in front of its stopping position. The strap 72 is still moved clockwise. The second stopping element 68-2 is still located in its stopping position. The rolling adapter 36-1 is still pushed by the driver 74-2 in the conveying direction 20 for finally leaving the separating device 14 and the loading position.

Figure 15:
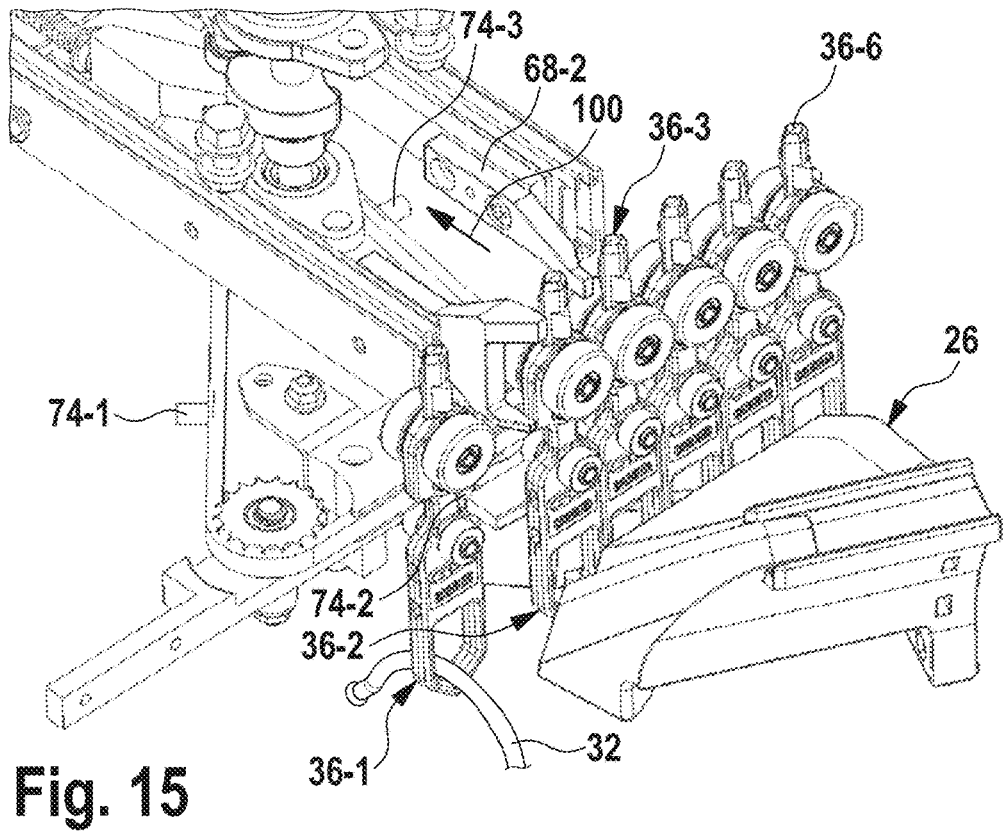
FIG. 15 shows a sixth state of a separating sequence.

FIG. 15 shows the re-filled loading position at a later time than in FIG. 14. The first stopping element 68-1 is located in its stopping position, i.e. completely extended in the positive transversal direction Z. While the second stopping element 68-2 is retracted for releasing the conveying path of the accumulated rolling adapters 36-2 to 36-6. The rolling adapters 36-2 to 36-6, which are not loaded, move downstream by one position so that the rolling adapter 36-2 is located in the loading position.

The strap 72 is still rotated clockwise (no longer shown) for bringing the driver 74-3 into a position corresponding to the position of the driver 74-2 in FIG. 10. Then, the driver 74-2 is located in the position of the driver 74-1 of FIG. 10. As soon as the driver 74-2, or 74-3, is located in this position the separating cycle is completed. Subsequently, next separating cycle can begin, as illustrated in FIG. 10.

Thus, the separating process is described completely.

It is clear that, dependent on a length of the strap 42, more or less drivers 74 are attached to the outside of the strap 32 at a suitable distance relative to each other. In the examples of FIGS. 10 to 15 three drivers 74-1 to 74-3 are provided exemplarily.

Relative distance of the first and second stopping elements 68-1 and 68-2 in the longitudinal direction X, i.e. in the conveying direction 20, is selected such that the second stopping element 68-2 can be moved into the conveying path of the rolling adapter 36, or the secondary load carrier 38, positioned directly upstream to the rolling adapter 36, or the secondary load carrier 38, in the loading position.

(Clear) distance between the switch 76 and the rolling adapter 36-1 in the transversal direction Z (cf., e.g. FIG. 6) is selected as small as possible for initiating the separating process (cf. FIGS. 10 to 15) as fast as possible, as soon as the hanger 32 has passed the transport opening 48.

As shown in FIGS. 8 and 9, the chute 26 is also arranged as close as possible in the transversal direction Z to the rolling adapter 36-1 in the loading position. In the longitudinal direction X, i.e. the conveying direction 20, the chute 26 is positioned preferably such that a sidewall of the recessed portion 88, which sidewall is arranged upstream, is positioned at the height of the upstream sidewall of the transport opening 48. The upper parabolic portion 84-1 of the upper guiding track 80-1 (cf. FIG. 5) preferably reaches across a downstream end of the rolling adapter 36-1 in its loading position (cf. FIG. 8).

The parabolic embodiment of the guiding tracks 80-1 and 80-2, including the embossed and recessed portions 86 and 88, provide that the hanger 32 is always passed safely through the transport opening 48.

| List of reference numerals | |
|---|---|
| 10 | loading station |
| 12 | accumulation line |
| 14 | separating device |
| 16 | feeding device |
| 18 | overhead conveyor |
| 20 | conveying direction |
| 22 | transport rail |
| 24 | feeding device |
| 26 | chute |
| 28 | feeding belt |
| 30 | feeding spindle |
| 32 | (coat) hanger |
| 34 | primary load carrier |
| 36 | rolling adapter |
| 38 | secondary load carrier |
| 40 | control unit |
| 42 | signal/data line |
| 44 | wireless communication |
| 46 | body of 34 |
| 48 | transport opening |
| 50 | head portion of 32 |
| 52 | tip of 50 |
| 54 | travelling rollers |
| 56 | supporting rollers |
| 58 | head web |
| 60 | driver web |
| 62 | ID device |
| 64 | drive chain |
| 66 | driver element of 64 |
| 68 | stopping element |
| 70 | conveying string |
| 72 | straps |
| 74 | driver |
| 76 | switch |
| 78 | face of 26 |
| 80 | guiding track |
| 82 | straight portion of 80 |
| 84 | parabolic portion of 80 |
| 86 | embossed portion |
| 88 | recessed portion |
| 90 | pivotal movement |
| 92 | movement of straps |
| 94 | retracting movement of 68-1 |
| 96 | extending movement of 68-2 |
| 98 | extending movement of 68-1 |
| 100 | retracting movement of 68-2 |

The invention claimed is:

1. A loading station for loading automatically a primary load carrier, of an overhead conveyor with a secondary load carrier, for hanging goods, wherein the primary load carrier, which is substantially oriented vertical during transport, is supported for movement in a guided manner by a pair of travelling rollers within a transport rail of the overhead conveyor, wherein the loading station comprises:
   an accumulation line configured to accumulate a plurality of primary load carriers, which are movable in a conveying direction along the accumulation line, one behind the other along the conveying direction;
   a separating device, which is arranged laterally to the accumulation line, comprising:
      first and second stopping elements, wherein the first and second stopping elements are respectively supported in a movable manner transversally to the accumulation line so that each of the stopping elements, when being located in a stopping position, is movable into a conveying path of the primary load carriers for accumulating the primary load carriers, and, when being located in a release position, is movable out of the conveying path for allowing movement of the primary load carriers in the conveying direction; and a switch;

a control unit; and a feeding device arranged laterally to the accumulation line, and configured to guide a hanger-shaped head portion of the secondary load carrier through a transport opening in the primary load carrier for loading the primary load carrier when the primary load carrier is located in a loading position corresponding to a downstream accumulation position of the accumulation line defined by the stopping position of the first stopping element;

wherein the switch is arranged oppositely to the feeding device so that the primary load carrier in the loading position locatable between the switch and the feeding device, wherein the switch is configured to be moved by the secondary load carrier, from a normal position into a separating position as soon as the secondary load carrier has passed through the transport opening in the primary load carrier, and to transmit a separating signal to the control unit; and wherein the control unit is configured to cause, when the control unit receives the separating signal, the loaded primary load carrier to exit the loading position in the conveying direction.

2. The loading station of claim 1, wherein the primary load carrier is oriented substantially vertical in the loading position and along the accumulation line.

3. The loading station of claim 1, wherein the feeding device comprises a chute defining an inclined plane declining towards the loading position and along which the secondary load carrier is slidable into the transport opening of the primary load carrier located in the loading position.

4. The loading station of claim 3, wherein a vertically oriented cross section of the chute comprises an embossed portion, on which an apex of the hanger-shaped head section is slidable towards the loading position, and an adjacent recessed portion configured to guide a tip of the hanger-shaped head portion towards the loading position.

5. The loading station of claim 4, wherein the embossed portion and the recessed portion define, in a top view of the chute, parabolic guiding-track sections leading into the loading position starting from straight parallel guiding-track sections.

6. The loading station of claim 1, wherein the control unit is configured to cause the loaded primary load carrier to exit the loading position by moving the first stopping element from the stopping position into the release position while the second stopping element is moved from the release position into the stopping position so that the loaded primary load carrier exits the loading position while all other primary load carriers, which are located downstream to the loading position, are held by the second stopping element.

7. The loading station of claim 1, wherein the separating device further comprises a closed circulating conveying string, which comprises at least one driver projecting out, wherein the conveying string is arranged such that the at least one driver is contactable only the primary load carrier in the loading position of the accumulated primary load carriers pushing the primary load carrier parallel to the conveying direction.

8. The loading station of claim 7, wherein the conveying string is movable in a clocked manner when the conveying string comprises several drivers, wherein the drivers are arranged at equal distances along the conveying string, and wherein a cycle is defined by the distance between adjacent drivers.

9. The loading station of claim 1, wherein a relative distance of the first and second stopping elements in the conveying direction is less than a distance between two accumulated primary load carriers.

10. The loading station of claim 1, wherein the switch is a contact switch, or a switching rocker, that returns automatically into normal position after deflection by the secondary load carrier and after transporting away the loaded primary load carrier from the loading position.

11. An overhead conveyor comprising the loading station of claim 1.

12. The loading station of claim 1, wherein the primary load carrier is a a rolling adapter.

13. The loading station of claim 1, wherein the secondary load carrier is a hanger.

14. The loading station of claim 1, wherein the switch is configured to be moved by the secondary load carrier by means of contact.

15. The loading station of claim 5, wherein the parabolic guiding-track portion of the embossed portion has a greater slope than the parabolic guiding-track portion of the recessed portion.

\* \* \* \* \*